US012257678B1

(12) United States Patent
Henry et al.

(10) Patent No.: US 12,257,678 B1
(45) **Date of Patent: *Mar. 25, 2025**

(54) SHAFT LOCKING MECHANISM

(71) Applicant: Reel Power Licensing Corp., Oklahoma City, OK (US)

(72) Inventors: Joseph Henry, Oklahoma City, OK (US); David Lasswell, Oklahoma City, OK (US)

(73) Assignee: Reel Power Licensing Corp., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,809

(22) Filed: Aug. 22, 2023

Related U.S. Application Data

(63) Continuation of application No. 17/509,849, filed on Oct. 25, 2021, now Pat. No. 11,766,764.

(60) Provisional application No. 63/105,997, filed on Oct. 27, 2020.

(51) Int. Cl.

| | |
|---|---|
| ***B25B 5/00*** | (2006.01) |
| ***B25B 5/02*** | (2006.01) |
| ***B25B 5/04*** | (2006.01) |
| ***B25B 5/10*** | (2006.01) |
| ***B25B 5/12*** | (2006.01) |
| ***B25B 5/14*** | (2006.01) |

(52) U.S. Cl.
CPC .................. *B25B 5/14* (2013.01); *B25B 5/02* (2013.01); *B25B 5/04* (2013.01); *B25B 5/103* (2013.01); *B25B 5/12* (2013.01)

(58) Field of Classification Search
CPC .... B25B 5/14; B25B 5/02; B25B 5/04; B25B 5/103; B25B 5/12
See application file for complete search history.

(56) References Cited

U.S. PATENT DOCUMENTS

| | | | | |
|---|---|---|---|---|
| 545,775 | A * | 9/1895 | Clark | F16L 3/14 248/62 |
| 4,575,061 | A | 3/1986 | Dille | |
| 7,883,121 | B2 | 2/2011 | Henry | |
| 10,408,371 | B2 * | 9/2019 | Floyd | F16L 23/10 |
| 10,738,808 | B2 * | 8/2020 | Pryor | A61M 5/1415 |
| D905,805 | S * | 12/2020 | Muir | D21/694 |
| 11,766,764 | B1 * | 9/2023 | Henry | B25B 5/12 269/287 |
| 2011/0000568 | A1 | 1/2011 | Parton | |

* cited by examiner

*Primary Examiner* — Lee D Wilson
(74) *Attorney, Agent, or Firm* — Phillips Murrah PC; Martin Ozinga

(57) ABSTRACT

A retrievable shaft locking mechanism for axial and rotational locking on smooth round shafts with a lever providing tensioning of the clamping ring and vectorially supporting a clamping action through a horizontal dowel pin.

1 Claim, 3 Drawing Sheets

SHAFT LOCKING MECHANISM

CROSS-REFERENCE TO RELATED APPLICATIONS

The present application is a continuation of U.S. patent application Ser. No. 17/509,849, filed on Oct. 25, 2021, which claims priority from U.S. Provisional Application Ser. No. 63/105,997 filed on Oct. 27, 2020. Each of the applications listed above is expressly incorporated herein by reference in its entirety.

BACKGROUND OF THE INVENTION

1. Field of the Invention

In general, the present invention relates to a shaft locking mechanism and method of using the same. More particularly, the present invention is a shaft locking mechanism for axial and rotational locking on smooth round shafts.

2. Description of the Prior Art

It is known that providing a sound removable lock on a round piece of rotating metal is challenging. The mechanical forces associated with centrifugal forces for placing a removable lock on very low friction metal surfaces makes it difficult for it to stay in place unless very firmly secured. There are known locks that close with a lever action, spring tension, and ball lock mechanism. Unfortunately, these are all fixed diameter and fixed clamping forces, which make it more difficult to match the required diameter precisely without excessive force that may not be achieved by hand.

It is therefore desirable to provide a shaft locking mechanism for axial and rotational locking on smooth round shafts that provides a secure lock without slippage but is also easy to implement. The above discussed limitations in the prior art is not exhaustive. The current invention provides an inexpensive, time saving, more reliable apparatus, and method of using the same where the prior art fails.

SUMMARY OF THE INVENTION

In view of the foregoing disadvantages inherent in the known types of shaft locking mechanisms and methods of use now present in the prior art, the present invention provides a new and improved shaft locking mechanism, which may be easily implemented. As such, the general purpose of the present invention, which will be described subsequently in greater detail, is to provide a new and improved shaft locking mechanism for axial and rotational locking on smooth round shafts and method of using the same, which has all the advantages of the prior art devices and none of the disadvantages.

To attain this, the present invention essentially comprises a quick locking device for producing axial locking forces on a smooth round shaft having a housing, a freely supported clamping ring adapted to surround a shaft and located inside the housing with pre-tensioning by a clamp force in any chamber, changeable in an axial direction. Horizontally trapped dowel pin provided on the clamping ring and contacting surfaces, which limits the chamber in contact points, a locking unit and a clamping unit provided with an adjustable locking thread and arranged so that axial locking forces are transmitted through the locking unit and the locking thread of the clamping unit and through the horizontal dowel pin for form-locking connection between the clamping ring and the shaft in the region of self-locking, and a lever providing tensioning of the clamping ring and vectorially supporting a clamping action through the horizontal dowel pin.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved shaft locking mechanism and method of using the same, which is of a durable and reliable construction and may provide a variable clamping diameter via a set screw.

It is a further object of the present invention to provide a new and improved shaft locking mechanism, which may be easily and efficiently manufactured and marketed.

An even further object of the present invention is to provide a new and improved shaft locking mechanism, which is susceptible to a low cost of manufacture with regard to both materials and labor, and which accordingly is then susceptible to low prices of sale to the consuming industry, thereby making such valve economically available to those in the field.

Still another object of the present invention is to provide a new and improved shaft locking mechanism, which provides all of the advantages of the prior art, while simultaneously overcoming some of the disadvantages normally associated therewith.

Another object of the present invention is to provide a new and improved shaft locking mechanism with a variable clamping force via an adjustment screw.

Yet another object of the present invention is to provide a new and improved shaft locking mechanism that may be utilized in both forward and backward rotations.

An even further object of the present invention is to provide a new and improved shaft locking mechanism wherein the axial locking forces are transmitted through the locking unit and the locking thread of the clamping unit.

Still another object of the present invention is to provide a new and improved shaft locking mechanism with a lever providing tensioning of the clamping ring and vectorially supporting a clamping action through a horizontal dowel pin.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices wherein.

DETAILED DESCRIPTION OF THE PREFERRED EMBODIMENTS

Figure 1:
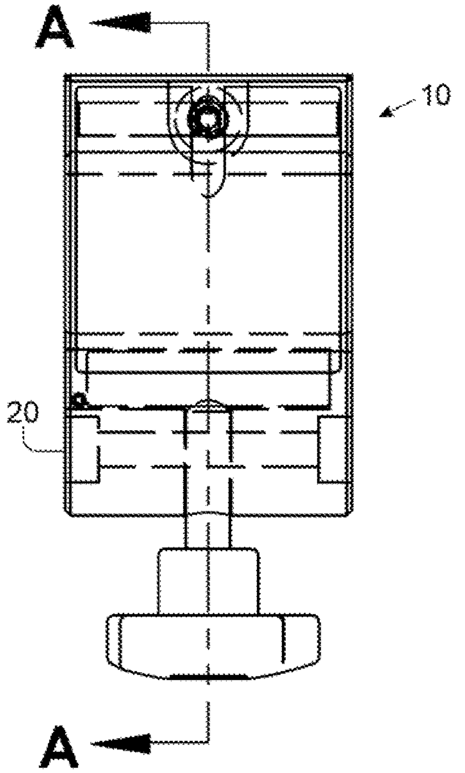
FIG. 1 is a general illustration of a preferred embodiment of the invention.
Figure 2:
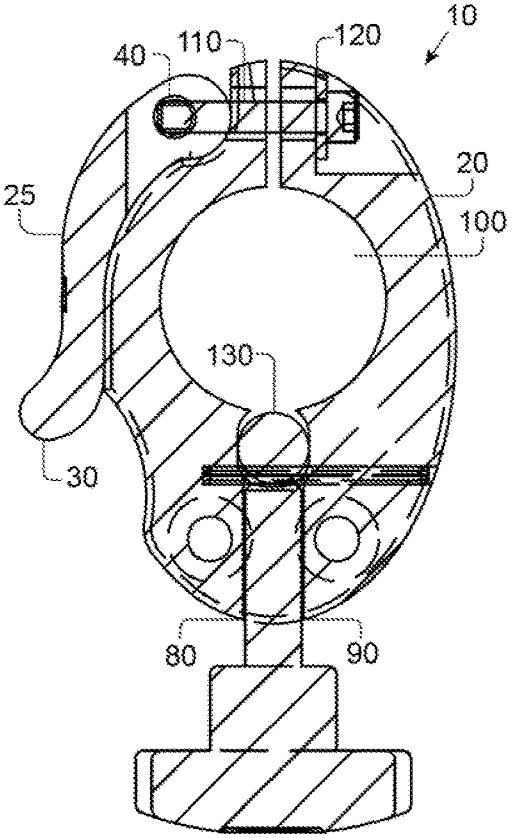
FIG. 2 is a general illustration of a preferred embodiment of the invention.
Figure 3:
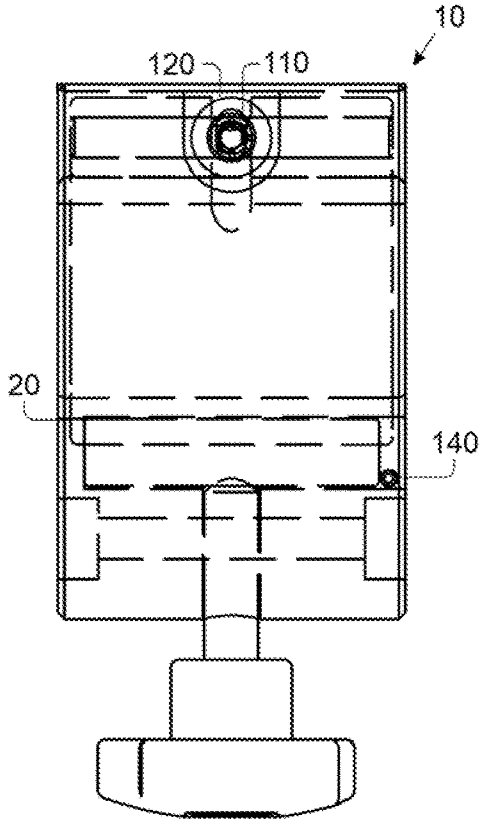
FIG. 3 is a general illustration of a preferred embodiment of the invention.
Figure 4:
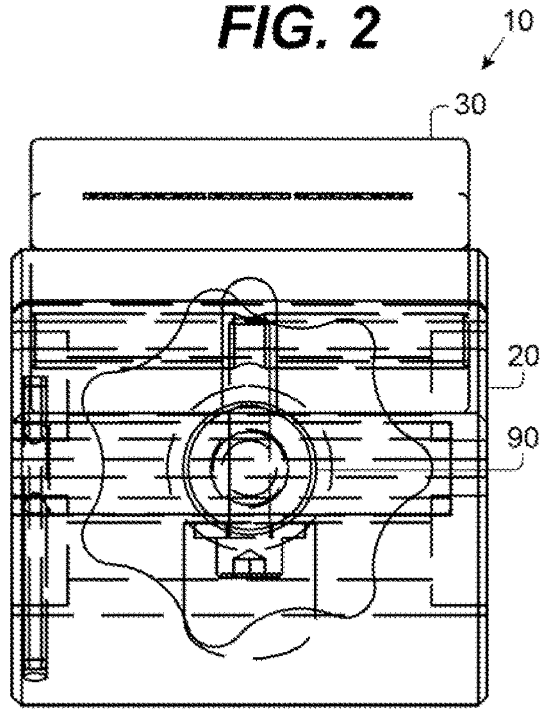
FIG. 4 is a general illustration of a preferred embodiment of the invention.
Figure 5:
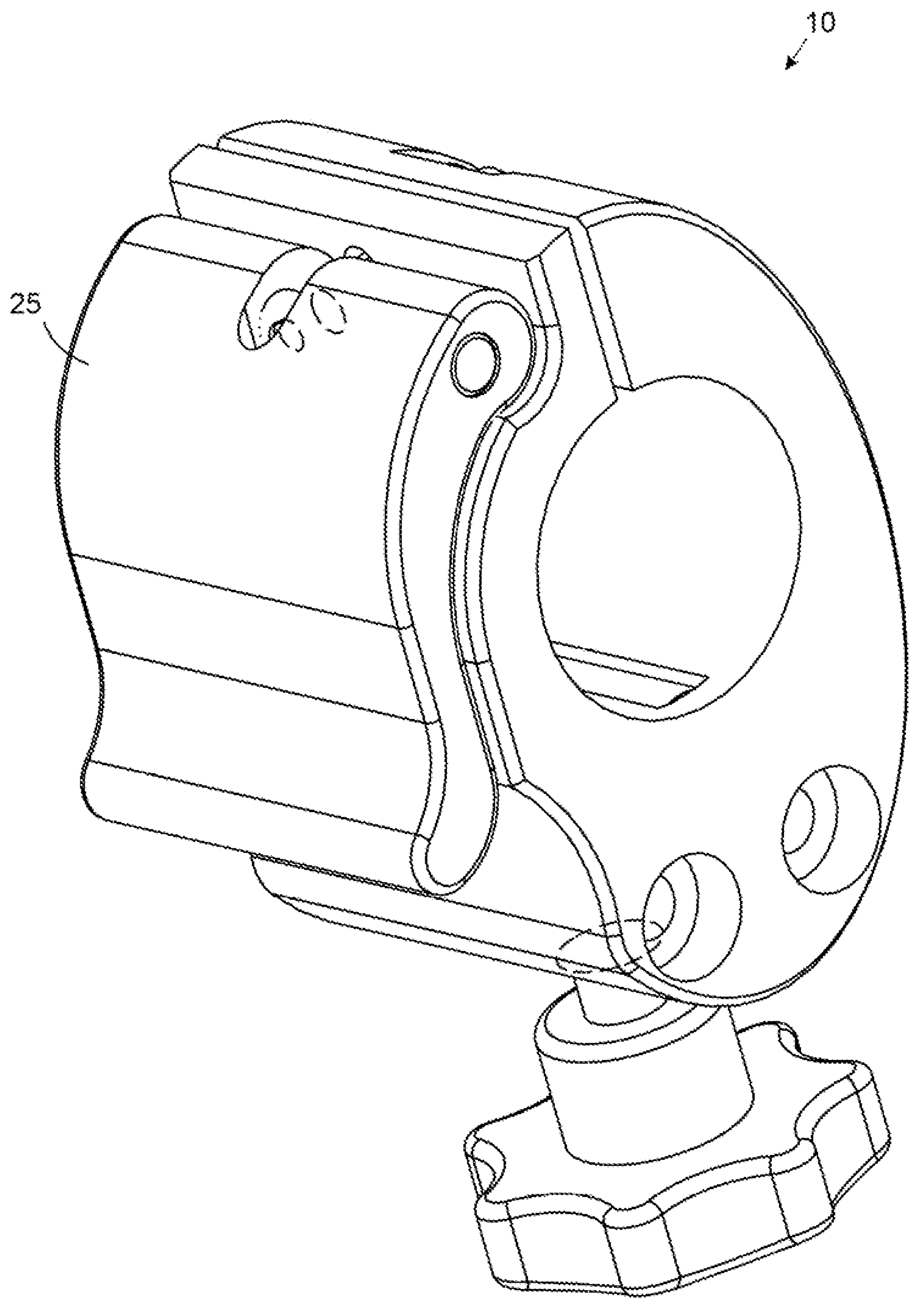
FIG. 5 is a general illustration of a preferred embodiment of the invention.
Figure 6:
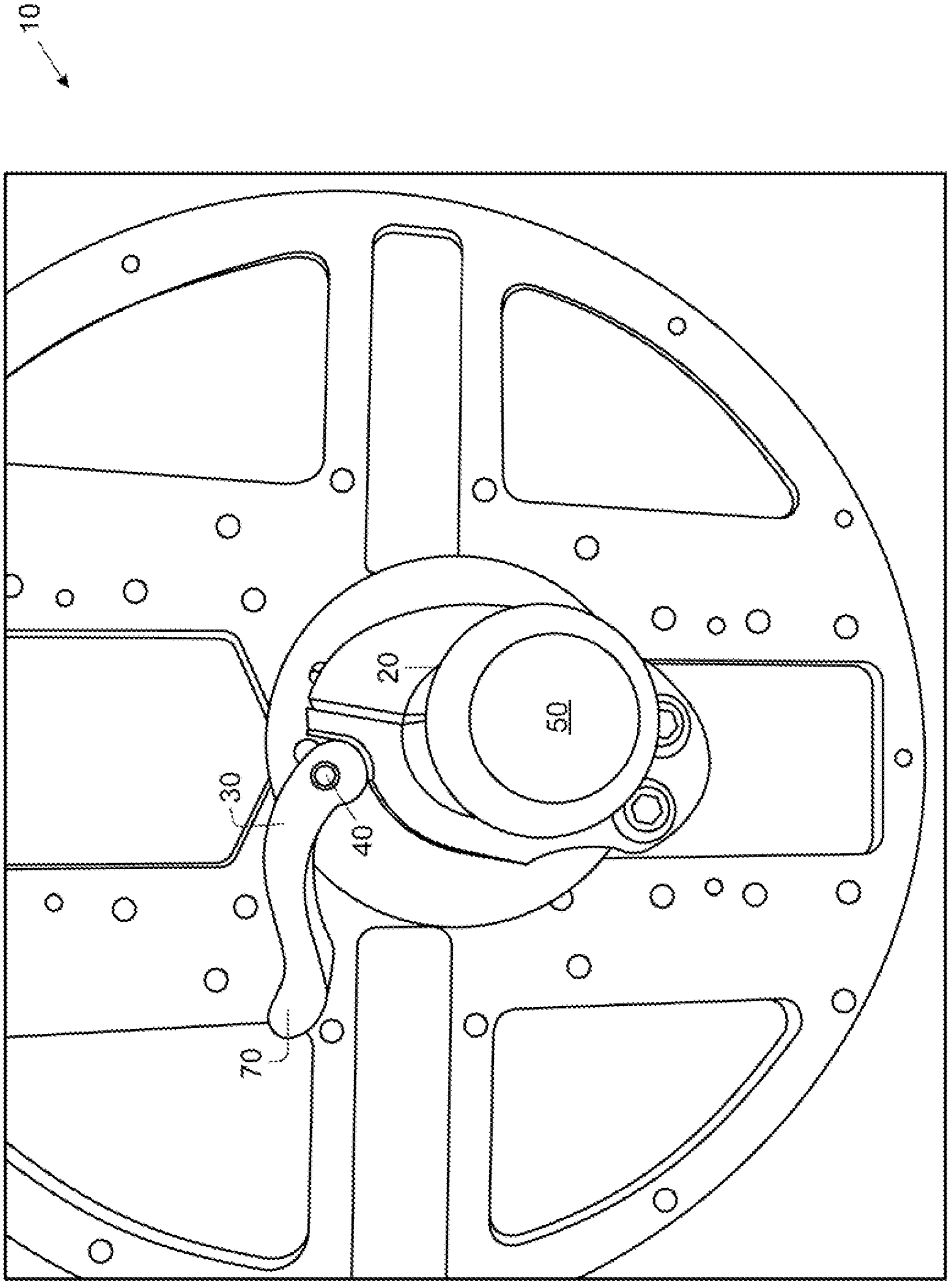
FIG. 6 is a general illustration of a preferred embodiment of the invention.

Referring to the illustrations, drawings, and pictures, reference character 10 generally designates a new and improved shaft locking mechanism and method of using same constructed in accordance with the present invention. Invention 10 is generally used for securing a reel on a rotating steal round bar with a generally smooth surface such as but not limited to supply rollers and spool machines. It is contemplated that invention 10 may be utilized for other applications.

Shaft locking mechanism 10 may comprise a housing 20 and a leverage bar 25 and or clamp and or clamping ring 30 wherein said clamp 30 is pivotally connected to housing 20 via pin 40. Clamp 30 provides axial locking forces on a shaft 50 when engaged and or locked such that clamp 30 is pushed to a down position 60 generally against housing 20. Clamp 30 is unlocked and or disengaged when clamp 30 is pushed away from housing 20 to open position 70.

Housing 20 may have threaded aperture 80 for receiving extended tip set screw 90 for adjusting an inner diameter 100 of housing 20. Screw 110 and washer 120 may be utilized. Housing 20 may include pin dowel 130 and pin slotted spring 140.

Shaft locking mechanism contemplates a housing, a freely supported clamping ring adapted to surround a shaft and located inside the housing with pretensioning by a clamp force in any chamber (whatever the shape, in this case oval), changeable in an axial direction.

Horizontally trapped dowel pin provided on the clamping ring and contacting surfaces, which limit the chamber in contact points, a locking unit and a clamping unit provided with an adjustable locking thread and arranged so that axial locking forces are transmitted through the locking unit and the locking thread of the clamping unit and through the horizontal dowel pin for form-locking connection between the clamping ring and the shaft in the region of self-locking, and a lever providing tensioning of the clamping ring and vectorially supporting a clamping action through the horizontal dowel pin.

The current invention 10 therefor contemplates a shaft locking mechanism for variable diameters of said shaft comprising: a housing having an adjustable inner diameter adapted to secure materials on said shaft while rotating a leverage bar pivotally connected to said housing for clamping said housing to said shaft; and adjustable length dowel pin connected to said leverage bar and said housing and adapted to change said inner diameter of said housing as desired.

Changes may be made in the combinations, operations, and arrangements of the various parts and elements described herein without departing from the spirit and scope of the invention. Furthermore, names, titles, headings, and general division of the aforementioned are provided for convenience and should, therefore, not be considered limiting.

We claim:

1. A shaft locking mechanism for variable diameters of said shaft comprising:

a housing having an adjustable inner diameter adapted to secure materials on said shaft while rotating;

a leverage bar pivotally connected to said housing adapted for clamping said housing to said shaft;

and adjustable length dowel pin connected to said leverage bar and said housing and adapted to change said inner diameter of said housing as desired;

an adjustable set screw adapted to provide contact and securing said shaft in said inner diameter of said housing; and wherein said shaft is made of metal.

* * * * *